March 12, 1963  L. R. SCHUESSLER  3,081,112
BOOKKEEPING SHEET AND UNITS
Filed May 13, 1957  5 Sheets-Sheet 1

INVENTOR
LEVYN R. SCHUESSLER
BY Cohn and Powell
ATTORNEYS.

March 12, 1963 L. R. SCHUESSLER 3,081,112
BOOKKEEPING SHEET AND UNITS
Filed May 13, 1957 5 Sheets-Sheet 2

INVENTOR
LEVYN R. SCHUESSLER
BY Cohn and Powell
ATTORNEYS.

March 12, 1963 L. R. SCHUESSLER 3,081,112
BOOKKEEPING SHEET AND UNITS
Filed May 13, 1957 5 Sheets-Sheet 3
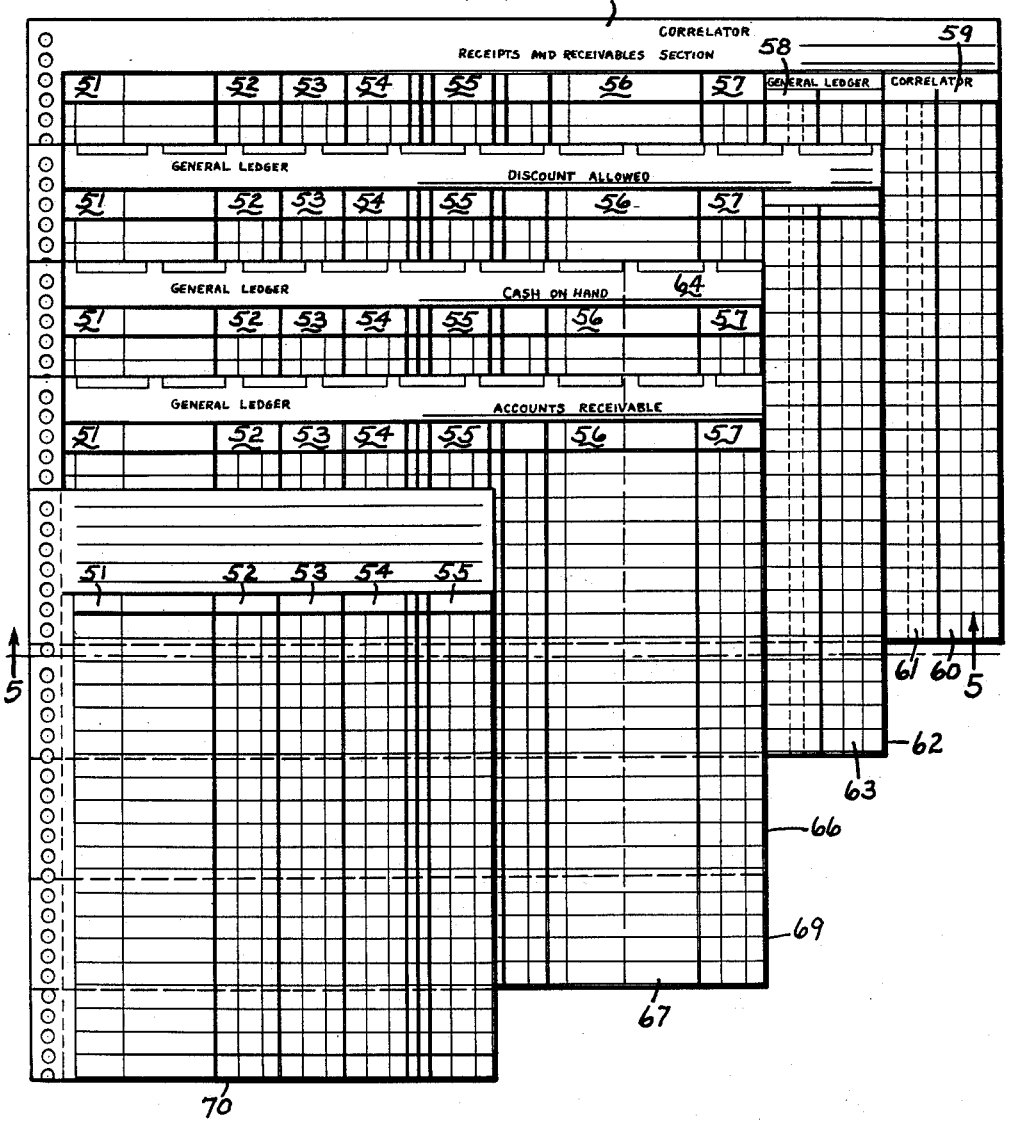
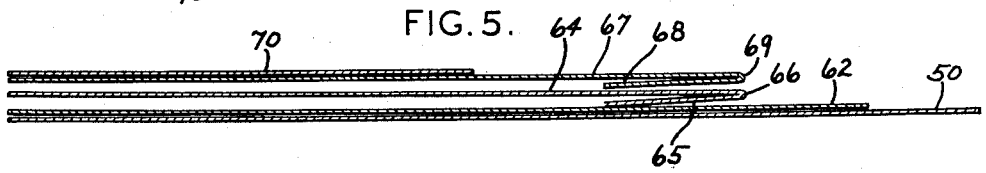
INVENTOR
LEVYN R. SCHUESSLER
BY Cohn and Powell
ATTORNEYS.

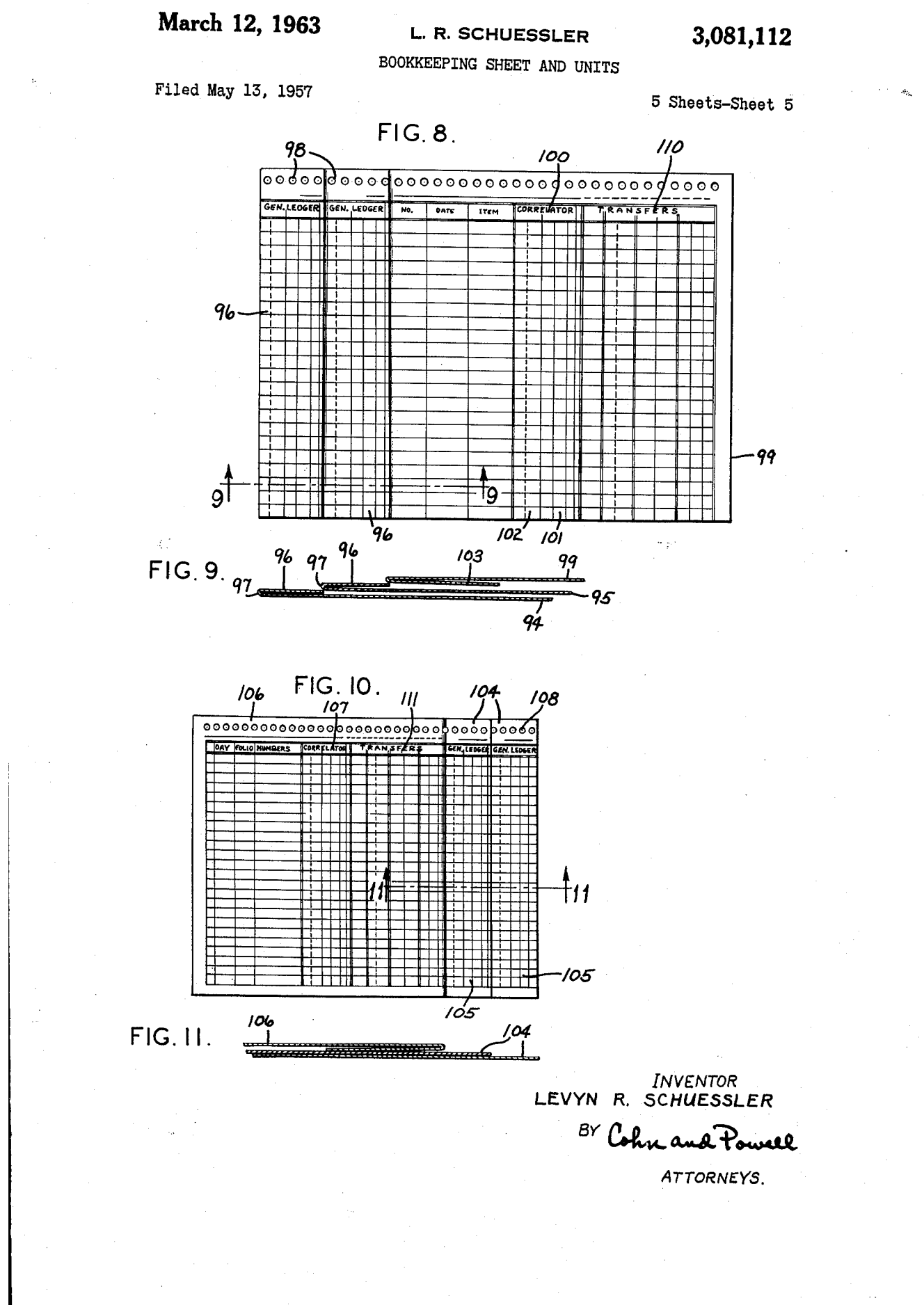

March 12, 1963

L. R. SCHUESSLER 3,081,112

BOOKKEEPING SHEET AND UNITS

Filed May 13, 1957

INVENTOR
LEVYN R. SCHUESSLER

BY Cohn and Powell

ATTORNEYS.

United States Patent Office 3,081,112
Patented Mar. 12, 1963

3,081,112
BOOKKEEPING SHEET AND UNITS
Levyn Ray Schuessler, 6939 Waterman Ave.,
University City 5, Mo.
Filed May 13, 1957, Ser. No. 658,634
5 Claims. (Cl. 283—66)

This invention relates to an improved general ledger sheet and to bookkeeping units provided by a plurality of such sheets.

An important object of the present invention is to provide a general ledger sheet that is constructed so that any desired number of ledger accounts can be assembled in a combined bookkeeping unit that enables entries to be recorded directly in the general ledger accounts affected by each transaction, and hence keeps a continuous up-to-the-minute general ledger.

Another important object is realized by the provision of a general ledger column at one end of the general ledger sheet and of a fold line at one side of such column to enable the column to be folded back on the sheet in order that entries can be made directly in general ledger columns of subjacent general ledger account sheets when the sheets are arranged in the desired bookkeeping unit, the sheets and unit affording the means by which two or more general ledger accounts affected by a transaction can be posted at the same time.

Yet another object is achieved by the provision of a correlator sheet in the bookkeeping unit located at one end of the stacked general ledger sheets which is a record that serves as an index to all accounts affected by each transaction, and makes it possible to record all accounts and the amounts by which each account is affected by each transaction without removing any of the general ledger account sheets that are being written as a bookkeeping unit to place additional sheets in such unit.

It is an important object to realize a combined bookkeeping unit that enables the direct posting of a plurality of general ledger accounts at the same time for each major transaction category, i.e. transactions that have to do with customers accounts such as charges and credits; transactions that have to do with creditors accounts such as amounts due and payments made through them; transactions involving cash receipts and cash disbursed; and transactions involving inventories and cost of sales records.

Another important object is achieved by the provision of a bookkeeping unit that is formed by a plurality of general ledger sheets in which the general ledger columns are folded over, and an arrangement of such sheets so that the columns are disposed in side by side relation, so that a multiplicity of general ledger accounts can be directly posted at the same time.

The foregoing and numerous other objects and advantages of the invention will more clearly appear from the following detailed description of the general ledger sheets and the combined bookkeeping units formed by such sheets, particularly when considered in connection with the accompanying drawing, in which:

FIG. 4 is a top plan layout view of a combined bookkeeping unit adapted for a major transaction category having to do with cash receipts;

FIG. 5 is a view in cross section of the bookkeeping unit as seen along line 5—5 of FIG. 4;

FIG. 8 is a top plan view of a combined bookkeeping unit adapted to record entries in a plurality of general ledger accounts;

FIG. 9 is a cross sectional view of the bookkeeping unit as seen along line 9—9 of FIG. 8;

FIG. 10 is a top plan view of another combined bookkeeping unit adapted to record entries in a plurality of general ledger accounts, and FIG. 11 is a cross sectional view of the bookkeeping unit as seen along line 11—11 of FIG. 10.

Figures 1, 2:
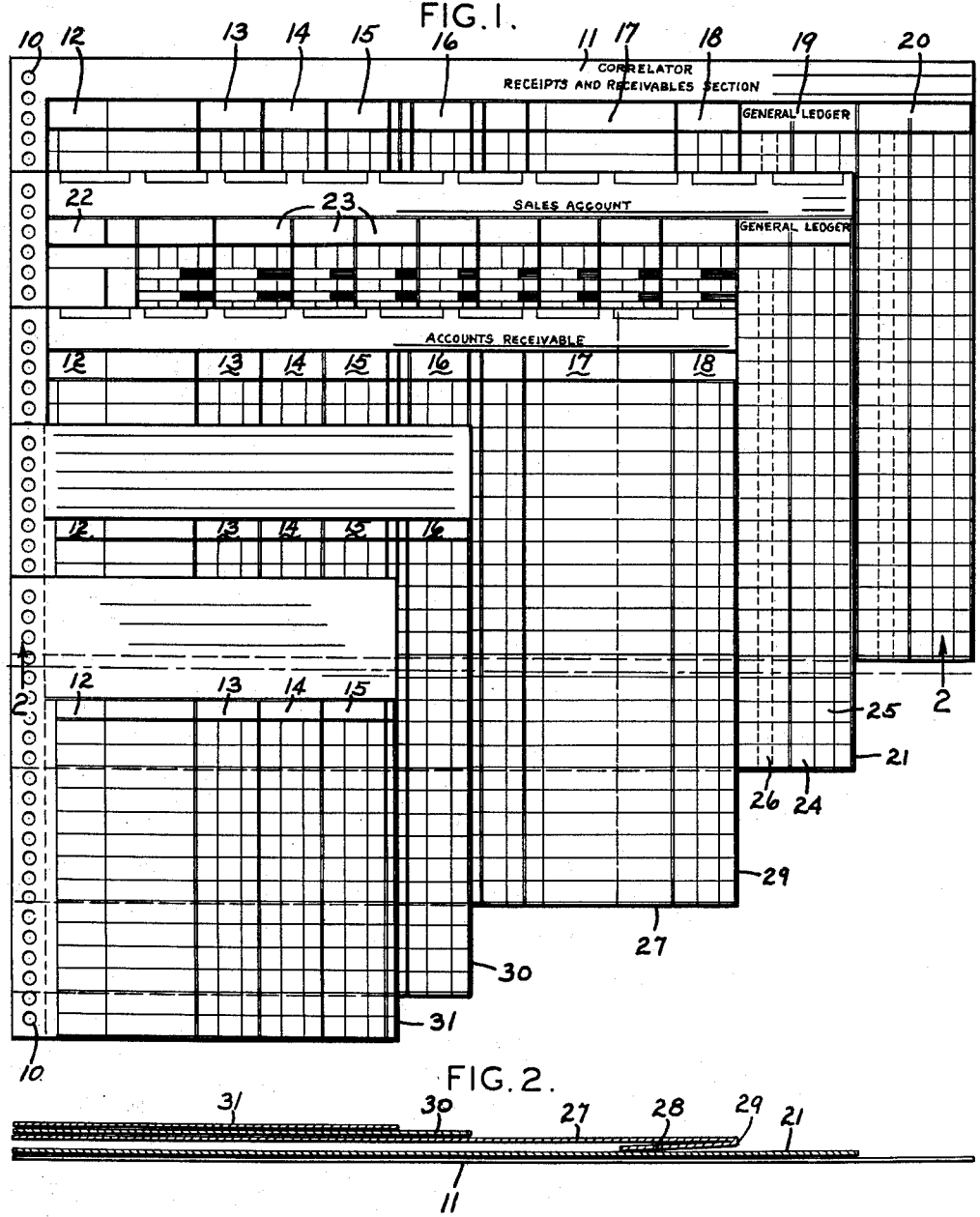
FIG. 1 is a top plan layout view of a combined bookkeeping unit adapted for a major transaction category having to do with customers' accounts.
FIG. 2 is a cross sectional view of the bookkeeping unit as seen along line 2—2 of FIG. 1.

Referring now by characters of reference to the drawings, and first to FIGS. 1 and 2, the combined bookkeeping unit adapted for a transaction having to do with customers' accounts will be described. It will be particularly noted that the general ledger sheets, customer's ledger sheet and customer's statement in FIG. 1 are shown in a layout top plan view in order that the columns of the individual sheets are readily visible. In placing the sheets on a pegboard or other holder by the provision of a series of spaced apertures 10 formed along the left hand edge of such sheets, care must be taken to place each sheet in position so that there will be a carbon copy reproduction on the proper line of entries made on the top or superjacent ledger sheet.

This bookkeeping unit (FIGS. 1 and 2) includes a correlator sheet 11 which is a record that serves as an index to all the accounts affected by each transaction, and makes it possible to record all the amounts by which each account is affected by each transaction without removing any of the general ledger account sheets which are being written as a unit to place additional general ledger sheets on the pegboard to complete the record of the transaction. The correlator sheet 11 includes a "date" column 12 at the left end just to the right of apertures 10, a "charge" column 13, a "credit" column 14, a "balance" column 15, a "previous balance" column 16, a column 17 adapted to identify the account, a "receipt" column 18, a "general ledger" column 19 and a "correlator" column 20 at the extreme right end of the sheet.

In assembling the unit, carbon paper is placed over correlator sheet 11 from the apertures 10 to the left edge of the correlator column 20. Then, a "sales account" general ledger sheet 21 is superimposed over the carbon paper. This sales account general ledger sheet 21 is provided with a date column 22 that is aligned with date column 12 of correlator sheet 11, and a plurality of columns 23 that are not depthwise aligned with any of the columns of the other sheets comprising the bookkeeping unit. This general ledger sheet 21 is provided with a general ledger column 24 at the extreme right end, the general ledger column 24 consisting of two parts, one part 25 being adapted to receive entries of debit and credit and the other part 26 being adapted to receive entries of the general ledger account number of the general ledger account in which the entry is made.

For reasons which will later appear, a carbon paper is disposed on the sales account general ledger sheet 21 only above the date column 22, so that there will be no carbon reproduction of entries in columns 23.

An "accounts receivable controlling account" general ledger sheet 27 is superimposed over the sales account general ledger sheet 21. Similar to correlator sheet 11, the accounts receivable general ledger sheet 27 includes a date column 12, a charge column 13, a credit column 14, a balance column 15, a previous balance column 16, a column 17 for name of customer, and a receipt column 18. This general ledger sheet 27 also includes a general ledger column 28, best shown in FIG. 2, at the extreme right end. Provided at the left hand side of general ledger column 28 is a fold line 29 which enables the general ledger column 28 to be folded back under the ledger sheet 27 as is best shown in FIG. 2. When folded under, the fold line 29 coincides with the left hand side of general ledger column 24 of ledger sheet 21, and thus the general ledger column 24 is exposed for direct entry of credit and debit.

A customer's ledger account sheet 30 is superimposed over the accounts receivable general ledger sheet 27, and a carbon paper (not shown) is located under ledger sheet 30. The ledger sheet 30 includes similar and aligned columns to that supplied on the general ledger sheet 27 and the correlator sheet 11, as for example, a date column 12, a charge column 13, a credit column 14, and a balance column 15 and a previous balance column 16.

If desired, a customer's statement sheet 31 is located over the customer's ledger account sheet 30. Again, a carbon paper (not shown) is located under the customer's statement sheet 31. This sheet 31 includes a similar date column 12, charge column 13, credit column 15 and a balance column 16.

It will be noted that when entries are made in the date column 12, charge column 13, credit column 14 and balance column 15 of the customer's statement sheet 31, similar entries will be produced by carbon on the corresponding depthwise aligned columns provided in the customer's ledger account sheet 30, in accounts receivable general ledger sheet 27 and in the correlator sheet 11. When entries made in the previous balance column 16 of the customer's ledger account sheet 30, similar entries will be produced by carbon on the aligned corresponding columns provided in the accounts receivable general ledger sheets 27 and in correlator sheet 11. When entries are made directly in the receipt column 18 of the accounts receivable general ledger sheet 27, a similar entry will be produced by carbon in the depthwise aligned column 18 provided in correlator sheet 11.

The charge column 13, the credit column 14 and balance column 15 of the accounts receivable general ledger sheet 27 are designated special columns in that they relate particularly to the subject of the account sheet of the major transaction category for which the bookkeeping unit is assembled. The underlying sales account general ledger sheet 21 is not provided with any special column. Therefore, in the combined bookkeeping unit, the accounts receivable general ledger sheet 27 is folded along the line 29 so that the general ledger column 28 is located underneath, hence exposing the general ledger column 24 provided on the sales account general ledger sheet 21 to enable direct entry of debits and credits. The bookkeeper at his convenience may transfer the total of any special column, as for example the charge and credit columns 13—14 provided on the accounts receivable general ledger sheet 27, to the general ledger column 28. Furthermore, at any time the entries made directly in the general ledger column 24 of the sales account general ledger sheet 21 may be brought back and transferred to the individual columns 23 to which they pertain by removing sheet 21 from the bookkeeping unit.

It is seen that the combined bookkeeping unit shown in FIGS. 1 and 2 permits the posting of two accounts at the same time, and that this result is made possible by the fact that the accounts receivable general ledger sheet 27 that is provided with the special columns 13—15 and is adapted to be folded along fold line 29 so that the general ledger column 28 is folded under to expose the general ledger column 24 of the underlying sales account general ledger sheet 21.

Figure 3:
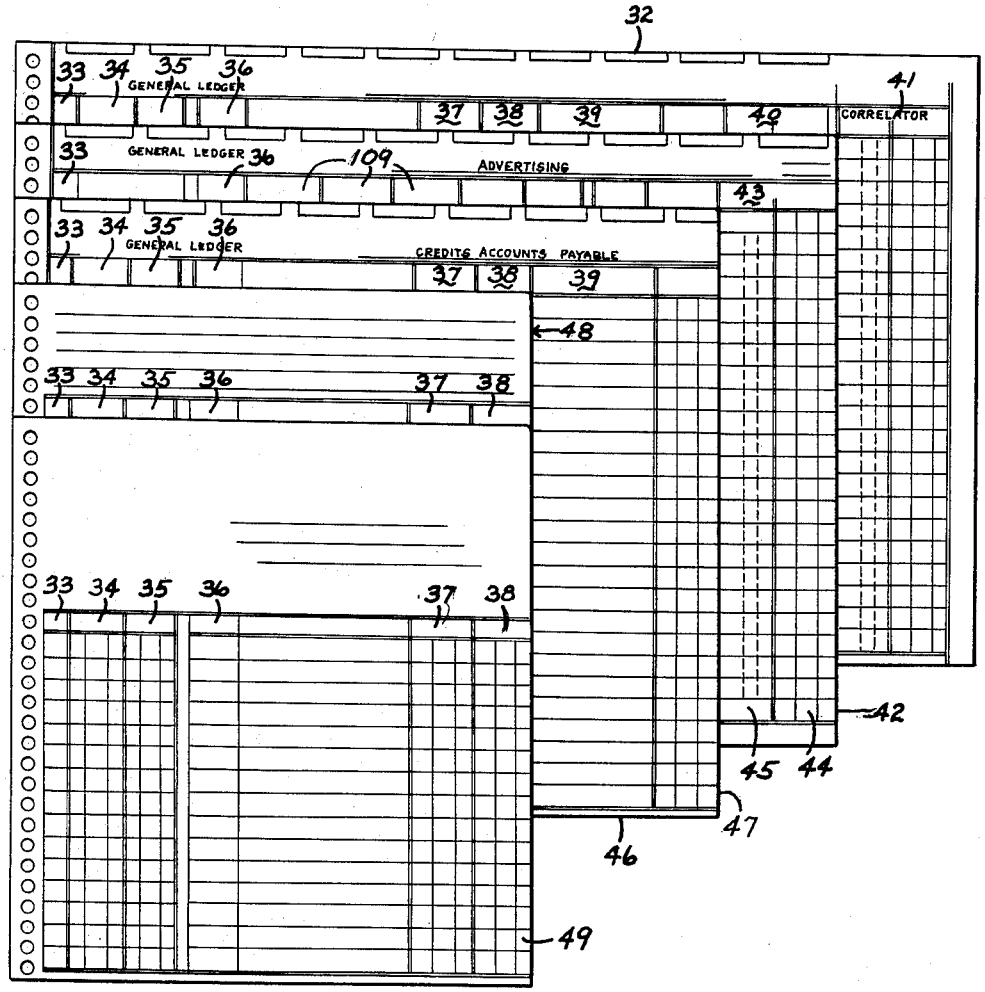
FIG. 3 is a top plan layout view of another combined bookkeeping unit adapted for a major transaction category having to do with creditors' accounts.

FIG. 3 discloses another combined bookkeeping unit adapted for a major transaction category having to do with creditors' accounts. This unit includes a correlator sheet 32 having a "folio" column 33, a "previous balance" column 34, a "payment" column 35, a "date" column 36, an "invoice" column 37, a "balance" column 38, a column 39 for indicating the name of account, a general ledger column 40 in which credits and debits may be entered and in which the general ledger account number of the general ledger account in which the entry is made may be entered alongside the debit or credit entry, and a "correlator" column 41 at the right end of the sheet 32.

Carbon paper (not shown) is placed on top of correlator sheet 32 from the aperture at the left end to the left hand side of the correlator column 41. Then, an "advertising" general ledger sheet 42 is placed on top of the carbon paper. This general ledger sheet 42 includes an identically placed folio column 33, date column 36 and a general ledger column 43 at the extreme right end of the sheet 42. It will be noted that the general ledger column 43 constitutes the extreme right edge of advertising general ledger sheet 42, and extends to the left hand side of correlator column 41. As explained previously, the general ledger column 43 is comprised of two parts, one part 44 being provided for the entry of debits and credits, and part 45 being provided for the entry of the general ledger account number.

The "credits accounts payable" general ledger sheet 46 is placed on top of general ledger sheet 42. The accounts payable general ledger sheet 46 includes a correspondingly placed folio column 33, previous balance column 34, payments column 35, date column 36, invoice column 37 and balance column 38. The accounts payable general ledger sheet 46 also includes a general ledger column (not visible) at the extreme right end of the sheet 46 which in its normally extended position overlies the general ledger column 43 of advertising general ledger sheet 42. However, this general ledger column of the accounts payable general ledger sheet 46 is shown folded under sheet 46 in FIG. 3 along a fold line 47 that coincides with the left hand side of general ledger column 43 of sheet 42. When the general ledger column (not shown) of the accounts payable general ledger sheet 46 is folded under as shown in FIG. 3, the general ledger column 43 of general ledger sheet 42 is exposed to enable direct entries.

Placed on top of the accounts payable general ledger sheet 46 is a creditor's ledger account sheet 48 which includes a similarly placed folio column 33, previous balance column 34, payments column 35, date column 36, invoice column 37 and balance column 38.

Placed on top of the creditor's ledger account sheet 48 is a remittance device sheet 49 which may be sent out with a check to the creditor. Again, this advice sheet 49 includes a folio column 33, previous balance column 34, payments column 35, date column 36, invoice column 37 and balance column 38.

Carbon paper (not shown) is placed under the advice sheet 49, under the creditor's ledger sheet 48, and under the advertising general ledger sheet 42. A special carbon sheet (not shown) is placed under the accounts payable general ledger sheet 47 so that only the entries made in the folio column 33 and date column 36 are reproduced on advertising general ledger sheet 42. It will be noted that the payments column 35 and invoice column 37 are considered special columns on the accounts payable general ledger sheet 46 in that they relate to the subject of the account sheet of the major transaction category for which the combined bookkeeping unit is assembled. These special columns 35 and 37 are not provided on the underlying advertising general ledger sheet 42. In order to make a direct entry of debit or credit in the general ledger column 43 of the general ledger sheet 42, the general ledger column (not shown) of accounts payable general ledger sheet 46 is folded under along fold line 47 as shown in FIG. 3.

When entries are made in columns 33–38 of remittance advice sheet 49, such entries are carbon-reproduced on creditor's ledger account sheet 48, on accounts payable general ledger sheet 46, and on the correlator sheet 42. When the name of the account is indicated in column 39 of accounts payable general ledger sheet 46, such entry is reproduced by carbon on correlator sheet 42. Since advertising general ledger sheet 42 does not contain any of the special columns as represented by payment and invoice columns 35 and 37, entries of such special columns are not reproduced by carbon on general ledger sheet 42. Rather, direct entry of debits or credits is made in general ledger column 43 along with the general ledger account number. The bookkeeper may at his convenience take out the advertising or other similar type of expense ledger sheet 42 from the bookkeeping unit and post the credits or debits made in general ledger column 43 under the appropriate column or columns 109. Moreover, the bookkeeper may at his convenience bring the totals of any of these special columns provided in accounts payable general ledger sheet 46 over into the general ledger column (not visible) provided at the end of the sheet.

The bookkeeping unit shown in FIGS. 4 and 5 is adapted for a major transaction category having to do with cash receipts. This unit includes a correlator sheet 50 that is identical with the correlator sheet 11 shown in FIG. 1. Briefly, the correlator sheet 50 includes a "date" column 51, a "charge" column 52, a "credit" column 53, a "balance" column 54, a "previous balance" column 55, a column 56 in which the name of the account may be entered, a "receipt" column 57, a general ledger column 58 and a correlator column 59. The correlator column 59 provided at the extreme right end of correlator sheet 50 consists of two parts, one part 60 being adapted to receive entries of debits and credits and the other part 61 being adapted to receive the general ledger account number of the general ledger account in which the entry is made.

Superimposed on correlator sheet 50 is a general ledger sheet 62 relating to discount allowed. It is seen that a general ledger column 63 is provided at the extreme right end of ledger sheet 62, and when such sheet 62 is assembled in the unit, the general ledger column 63 is aligned depthwise in the unit with general ledger 58 of correlator sheet 50. The discount allowed general ledger sheet 62 includes an identical corresponding date column 51, charge column 52, credit column 53, balance column 54, previous balance column 55, column 56 relating to the name of the account, and receipt column 57.

Disposed on top of discount allowed general ledger sheet 62 is a "cash on hand" general ledger sheet 64 which is identical to the subjacent discount allowed general ledger sheet 62. General ledger sheet 64 is provided with a general ledger column 65 (FIG. 5) which when extended is aligned depthwise of the unit with the general ledger column 63 of ledger sheet 62 and with general ledger column 58 of correlator sheet 50. However, general ledger sheet 64 is provided with a fold line 66 at the left hand side of general ledger column 65 which permits the general ledger column 65 to be folded under ledger sheet 64 as illustrated in FIG. 5 so that the general ledger column 63 of the subjacent discount allowed general ledger sheet 62 is exposed to permit direct entry of debits and credits in general ledger column 63. It will be noted that cash on hand general ledger sheet 64 is provided with identical columns 51–57 as provided on the subjacent sheets 62 and 63.

Disposed on top of general ledger sheet 64 is an identically ruled general ledger sheet relating to accounts receivable. This accounts receivable general ledger sheet 67 is provided with identical columns 51–57 inclusive as provided on the subjacent general ledger sheets, and is provided at the right hand end with a folded under general ledger column 68 as best shown in FIG. 5. Provided at the left hand side of general ledger column 68 is a fold line 69 which permits general ledger column 68 to be folded under to expose the general ledger column 63 of the underlying discount allowed general ledger sheet 62.

A customer's ledger sheet 70 is disposed on top of accounts receivable general ledger sheet 67, the sheet 70 being provided with an identical date column 51, a charge column 52, a credit column 53, a balance column 54, and a previous balance column 55, all of which are aligned dropwise in the unit with the corresponding columns provided on general ledger sheets 67, 64, 62 and correlator sheet 50.

When assembled in a combined bookkeeping unit as shown in FIG. 4, entries made in columns 51–55 inclusive of the customer's ledger sheet 70 will be reproduced by carbon in corresponding columns 51–55 in general ledger sheets 67, 64 and 62, and in correlator sheet 50. In accounts receivable general ledger sheet 67, the columns 52 and 53 relating to charges and credits are regarded as special columns relating to the subject of the account sheet of transaction for which the unit was assembled. Entries made in receipts column 57 on accounts receivable general ledger sheet 67 are reproduced by carbon in the corresponding underlying receipts column 57 provided on cash on hand general ledger sheet 64, in discount allowed general ledger sheet 62 and in the correlator sheet 50. The receipts column 57 on the cash on hand general ledger sheet is regarded as a special column relating particularly to the subject of the account sheet and to the transaction for which the unit is assembled.

In order to make an entry for discount allowed, it is necessary to post such entry in the general ledger column 63 of the discount allowed general ledger sheet 62. This is permitted since the general ledger columns 65 and 68 of sheets 64 and 67 are folded under to expose general ledger column 63. It is seen that entries made in general ledger column 63 are reproduced by carbon in the general ledger column 58 of correlator sheet 50. Thus it is seen that by the use of this combined bookkeeping unit three accounts are posted at one time.

The bookkeeper may at his convenience transfer the totals of any of the special columns of the accounts receivable general ledger sheet 67 and of the cash on hand general ledger sheet 64 to the folded under general ledger column 68 and 65.

Figure 6:
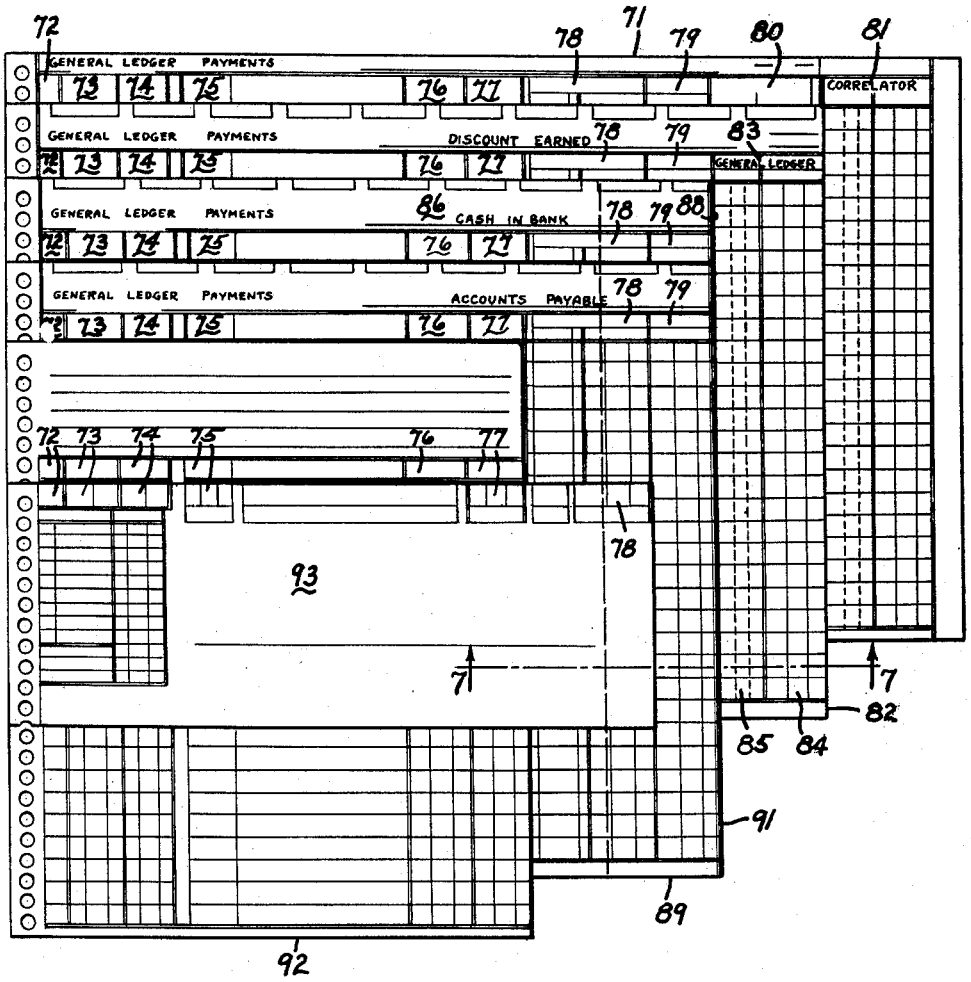
FIG. 6 is a top plan layout view of a combined bookkeeping unit adapted for a major transaction category having to do with cash disbursed as by a check.
Figure 7:
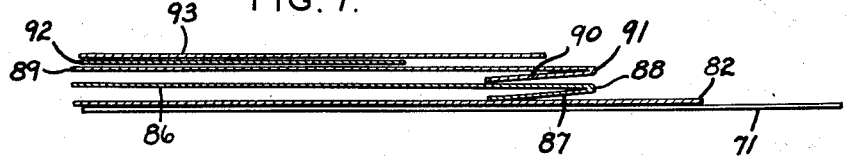
FIG. 7 is a cross sectional view of the bookkeeping unit as seen along line 7—7 of FIG. 6.

The bookkeeping unit shown in FIGS. 6 and 7 is adapted for a major transaction category having to do with cash disbursements. This unit (FIG. 6) includes a correlator sheet having a "folio" column 72, a "previous balance" column 73, a "payments" column 74, a "date" column 75, an "invoice" column 76, a "balance" column 77, a "bank" column 78 in which check numbers and withdrawal entries may be recorded, a "deposit" column 79, a general ledger column 80 in which debits and credits may be entered along with a general ledger account number of the entry being made, and a correlator column 81 in which debits and credits may be entered along with the general ledger account number of the entry being made. It will be noted that the correlator column 81 is at the right end of correlator sheet 71.

Disposed on top of correlator sheet 71 is a "discount earned" general ledger sheet 82. Provided at the extreme right hand edge of discount earned general ledger sheet 82 is a general ledger column 83 which is comprised of two parts, one part 84 being provided for the entry of debits and credits, and part 85 being provided for the entry of the general ledger account number of the general ledger account in which the entry is made. As is apparent from FIG. 6, the general ledger column 83 of general ledger sheet 82 is aligned depthwise of the unit with the general ledger column 80 of correlator sheet 71. Moreover, the discount earned general ledger sheet 82 is provided with identical columns 72–79 inclusive as those provided on correlator sheet 71.

Located on top of discount earned general ledger sheet 82 is an identical, ruled general ledger sheet 86 which relates to "cash in bank" account. This cash in bank general ledger sheet 86 is provided with identical columns 72-79 inclusive as provided in the subjacent discount earned general ledger sheet 82 and in correlator sheet 71. Furthermore, the cash in bank general ledger sheet 86 includes a general ledger column 87 (FIG. 7) which in the assembled bookkeeping unit is folded under the ledger sheet 86 along a fold line 88 provided at the left hand side of general ledger column 87. When in the folded position, the fold line 88 coincides with the left hand side of general ledger column 83 of ledger sheet 82 and hence exposes ledger column 83 for direct entry of credits and debits and account numbers.

Another identically ruled general ledger sheet 89 relating to "accounts payable" is disposed on top of the cash in bank general ledger sheet 86. Again, it is seen that the accounts payable general ledger sheet 89 is provided with identically ruled columns 72-79 inclusive as provided on subjacent ledger sheets 86, 82 and on correlator sheet 71. A general ledger column 90 (FIG. 7) is provided at the extreme right hand end of accounts payable general ledger sheet 89 which is adapted to be folded under sheet 89 along fold line 91 provided at the left hand edge of general ledger column 90. In the folded position of general ledger column 90, the fold line 91 coincides with the left hand edge of general ledger column 83 of discount earned general ledger sheet 82 and hence exposes general ledger column 83 for direct entries.

Located on top of "accounts payable" general ledger sheet 89 is the creditor's ledger account sheet 92 which is provided with a folio column 72, a previous balance column 73, a payments column 74, a date column 75, an invoice column 76 and a balance column 77, all of which are aligned depthwise of the unit with corresponding columns 72-77 inclusive provided in subjacent general ledger sheets 89, 86 and 82 and in correlator sheet 71.

A check 93 may be located on the pegboard or other holder on top of the creditor's ledger sheet 92, which facilitates filling out of the check while making entries in the various account ledger sheets affected by the transaction, the check 93 being provided with corresponding columns 72-78 inclusive aligned depthwise in the unit.

Entries in the columns 72 to 77 of creditor's ledger sheet 92 will be reproduced by carbon on the underlying general ledger sheets 89, 86, 82 and on correlator sheet 71. Entries made in columns 78 and 79 of the accounts payable general ledger sheet 89 will be reproduced by carbon in the corresponding columns on subjacent general ledger sheets 86, 82 and on correlator sheet 71. Entries made in the general ledger column 83 of the discount earned general ledger sheet 82 will be reproduced by carbon in the general ledger column 80 of the correlator sheet 71. Entries made in correlator column 81 will be made directly.

In accounts payable general ledger sheet 89, the payments column 74 and invoice column 76 are regarded as special columns relating particularly to the subject of the account sheet. In the cash in bank general ledger sheet 86, the bank column 78 relating to entries of withdrawal is considered a special column since it relates to the subject of the account sheet. The discount earned general ledger column of sheet 82 is not provided with any special column relating to discounts earned. Therefore, entries relating to discounts earned must be entered directly in the general ledger column 83 with the general ledger account number of the general ledger account in which the entry is made. This is permitted since the general ledger columns 87 and 90 of respective general ledger sheets 86 and 89 are folded under to expose general ledger column 83. Thus it is seen that by the use of this combined bookkeeping unit, three accounts can be posted at once and a continuous up to the minute general ledger can be maintained. The bookkeeper may at his convenience transfer the totals of any of the special columns of the accounts payable general ledger sheet 89 and cash in bank general ledger sheet 86 to the respective general ledger columns 90 and 87.

FIGS. 8 and 9 show a combined bookkeeping unit for directly posting a plurality of general ledger sheets relating to different general ledger accounts. In this unit, a pair of general ledger sheets 94 and 95 are arranged one on top of the other as best shown in FIG. 9. Each of these general ledger sheets 94—95 includes a general ledger column 96 adapted to be folded back on the sheet along a fold line 97 provided at the left hand side of the general ledger column 96. A plurality of apertures 98 provided along the upper edge of general ledger sheets 94 and 95 permit the sheets to be adjusted so that the general ledger columns 96 are disposed alongside of one another.

It is obvious, that any number of general ledger sheets may be arranged in this manner depending upon the number of ledger accounts affected by a transaction.

Disposed on top the general ledger sheet 95 is a correlator key sheet 99 is provided with a plurality of columns including a correlator key accounts column 100 which is comprised of two parts, one part 101 being adapted to receive debit and credit entries, and the other part 102 being adapted to receive entries of a general ledger account number of the general ledger account affected by the transaction. The correlator key sheet 99 includes a "transfer" section 110 through which entries can be taken in and out of the correlator key accounts column 100. As shown in FIG. 9, a portion 103 of correlator key sheet 99 is folded under so that the appropriate "date and item" columns are arranged adjacent the general ledger columns 96 of the underlying general ledger sheets 94 and 95. The correlator key sheet 99 is provided with a plurality of apertures 98 along its top edge in order to facilitate the relative disposition of the correlator sheet and general ledger sheets in the combined bookkeeping unit.

It is seen that the above described bookkeeping unit enables the posting of a plurality of general ledger accounts by permitting the direct entry of debits and credits in any of the general ledger columns 96 along with the general ledger account number of the general ledger account in which the entry is made. The bookkeeper at his convenience may transfer or bring back the entries in the general ledger column 96.

Still another combined bookkeeping unit adapted to facilitate posting a plurality of general ledger accounts is shown in FIGS. 10 and 11. In this unit, a plurality of general ledger sheets 104 are located one on top of the other as illustrated in FIGS. 10 and 11. Each of sheets 104 includes a general ledger column 105 at the extreme right hand end in which debits and credits can be entered along with the general ledger account number as previously described. Located on top of the uppermost general ledger sheet 104 is a correlator key sheet 106 which is provided with a correlator key accounts column 107 in which debits and credits may be entered along with the general ledger account number of the general ledger account affected by the transaction. This correlator key sheet 106 includes a transfer section 111 through which entries can be taken in and out of the correlator key accounts column 107. In assembling the unit, the general ledger sheets 104 are located by means of a plurality of apertures 108 on a pegboard or other like holder so that the end of each superimposed sheet is located at the left hand side of the general ledger column of the subjacent sheet.

It is seen that the combined bookkeeping unit shown in FIGS. 10 and 11 permits the posting of a plurality of general ledger accounts at the same time simply by posting the credit or debit in the general ledger column 105 of the general ledger account sheet along with the general ledger account number. The bookkeeper may transfer or bring back this entry into the proper column provided on the general ledger account sheet 104 at his convenience.

Although the improvements have been described by making particularized reference to a type of general ledger sheet and to various combined bookkeeping units, the detail of description is not to be understood as restrictive, numerous variants being possible within the principles disclosed and within the fair scope of the claims hereunto appended.

I claim as my invention:

1. In a bookkeeping unit for recording entries in a plurality of general ledger accounts affected by a major transaction category, a plurality of general ledger sheets of the same width arranged in stacked superimposed relation and connected together along one side edge, at least one of said sheets having a special column related to the account sheet of the major transaction category, having a general ledger column at the opposite side edge in which debit and credit entries can be recorded, and having a fold line immediately adjacent one side of said general ledger column to permit said column to be folded under said sheet, and another general ledger sheet therebelow having a general ledger column at one side edge aligned depthwise with the other said genreal ledger column to be exposed for direct entries when said other general ledger column is folded.

2. The combination and arrangement of elements as recited above in claim 1, but further characterized by the provision of a correlator sheet below the general ledger sheets and connected thereto along one side edge, said correlator sheet having columns aligned with the special columns of the superimposed general ledger sheets to enable carbon reproduction of entries, the correlator sheet having a general ledger column aligned depthwise with the exposed general ledger column of the superjacent general ledger sheet to enable carbon reproduction of entries, the correlator sheet being wider than said ledger sheets, and having a correlator column at the opposite side edge that extends outwardly beyond the general ledger columns of said superimposed sheets in which debit and credit entries can be made directly.

3. In a bookkeeping unit for recording entries in general ledger accounts affected by a major transaction category, a plurality of general ledger sheets of the same width arranged in stacked superimposed relation and connected together along one side edge, a plurality of general ledger sheets each provided with one or more special columns relating to the account sheet of the major transaction category, corresponding special columns on said sheets being aligned depthwise of the unit to permit carbon reproduction of entries, each general ledger sheet being provided with a general ledger column at the opposite side edge in which debit and credit entries can be posted, and each being provided with a fold line immediately adjacent one side of the general ledger column to enable the said general ledger column to be folded under said sheet, said general ledger columns being depthwise aligned in said unit, another general ledger sheet therebelow having a general ledger column at the side edge aligned depthwise in the unit with the other said general ledger columns so as to be exposed for direct entries when said other general ledger columns are folded, all the general ledger sheets above the lowermost general ledger sheet in the unit having the general ledger columns folded under about said fold line to expose the general ledger column of the lowermost general ledger sheet.

4. In a bookkeeping unit for recording entries in general ledger accounts affected by a major transaction category, a plurality of general ledger sheets of the same width arranged in stacked, super-imposed relation and connected together along one side edge, at least one of said sheets having a special column related to the account sheet of the major transaction category, having a general ledger column at the opposite side edge in which debit and credit entries can be recorded, and having a fold line immediately adjacent one side of the general ledger column to enable folding of said column under said sheet, at least one other of said sheets therebelow being provided with a plurality of columns, the region above the last said sheet and below the special column free of carbon to preclude reproduction of said special column on the last said sheet, the last said sheet having a general ledger column at the side edge aligned depthwise of the unit with the general ledger column of the superjacent sheet so as to be exposed when the last said column is folded along said fold line, whereby to permit direct entries, all the general ledger sheets above the lowermost general ledger sheets in the unit having the general ledger columns folded under to expose the general ledger columns of the lowermost general ledger sheet.

5. In a bookkeeper unit for recording entries in general ledger accounts effected by a major transaction category, a plurality of general ledger sheets of the same width arranged in stacked superimposed relation and connected together along one side edge, each of said general ledger sheets being provided with a general ledger column along the opposite side edge, a correlator sheet disposed below the said general ledger sheets and connected thereto along one side edge, the correlator sheet being wider than said general ledger sheets and providing a correlator column at the opposite side edge that extends outwardly beyond the general ledger columns of the superimposed general ledger sheets, the correlator sheet being provided with a general ledger column adjacent the correlator column, the said general ledger columns of said general ledger and correlator sheets being depthwise aligned in said unit when said sheets are laid flat, all of the general ledger sheets above the lowermost general ledger sheet in the unit having their general ledger columns folded under along a fold line immediately adjacent the side of said general ledger columns so as to expose only the general ledger column of the lowermost general ledger sheet.

References Cited in the file of this patent

UNITED STATES PATENTS

| | | |
|---|---|---|
| 521,882 | Himrod | June 26, 1894 |
| 1,025,744 | Houghton | May 7, 1912 |
| 1,442,266 | Graham et al. | Jan. 16, 1923 |
| 1,885,928 | Lilly | Nov. 1, 1932 |

FOREIGN PATENTS

| | | |
|---|---|---|
| 112,022 | Sweden | Apr. 25, 1942 |